June 20, 1933.   L. A. F. RODGERS   1,914,866
COMBINATION KIT
Filed Aug. 6, 1931   3 Sheets-Sheet 1
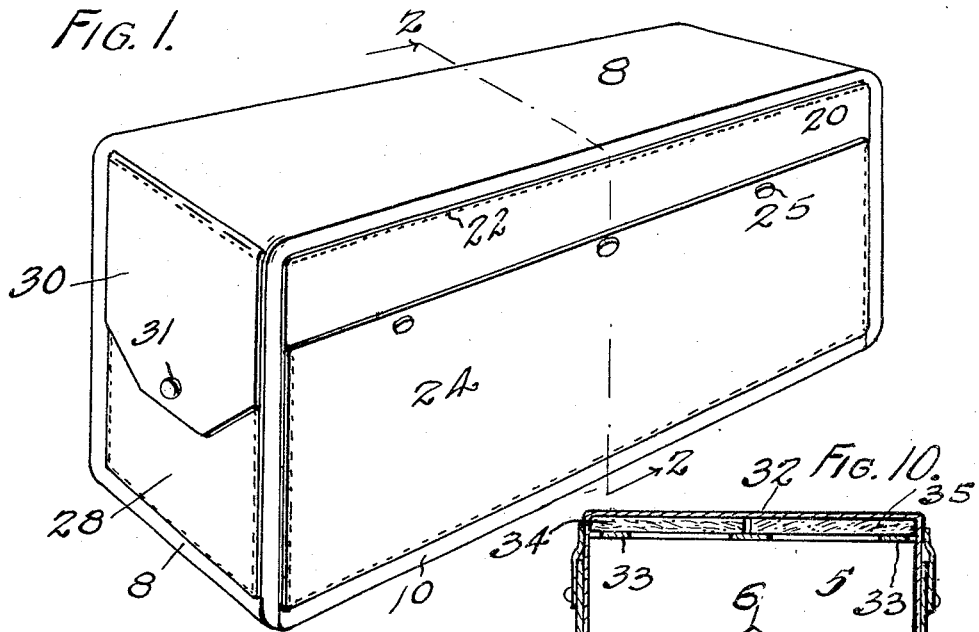
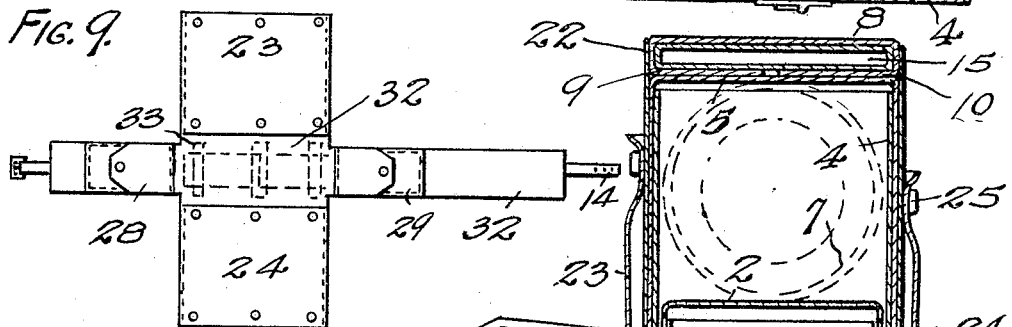
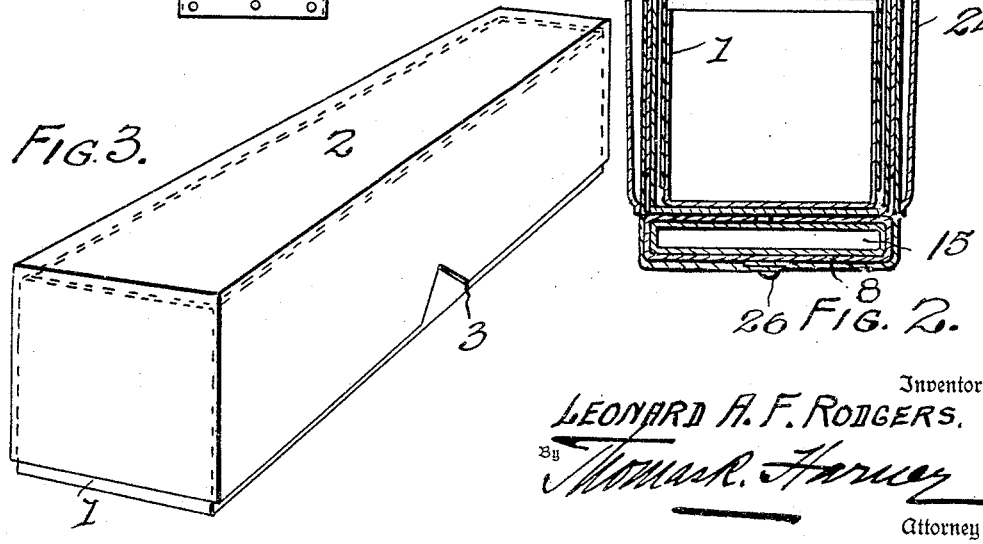
Inventor
LEONARD A. F. RODGERS.
By Thomas R. Harvey
Attorney

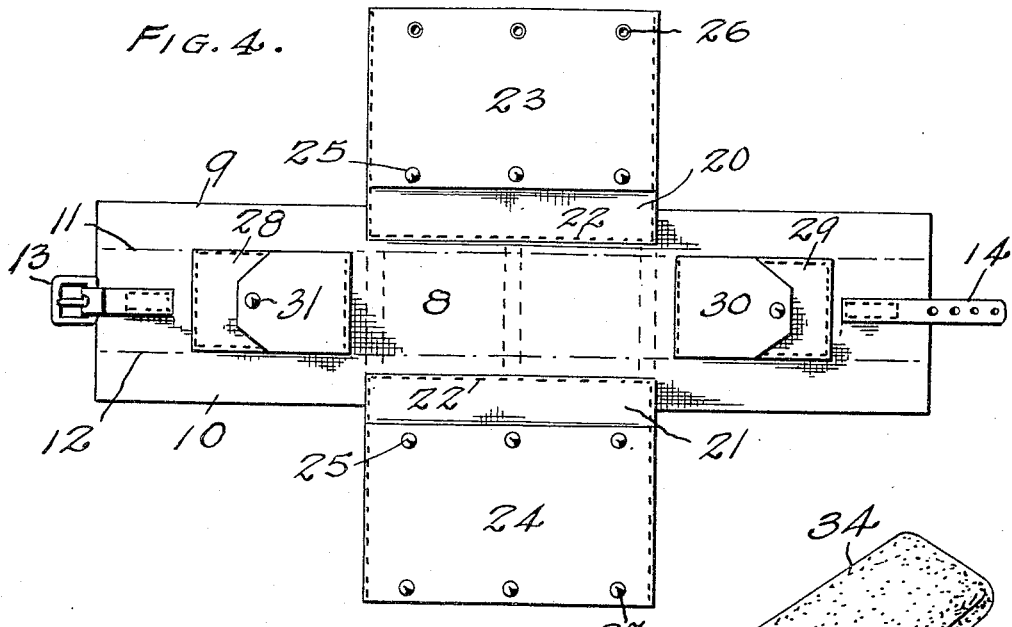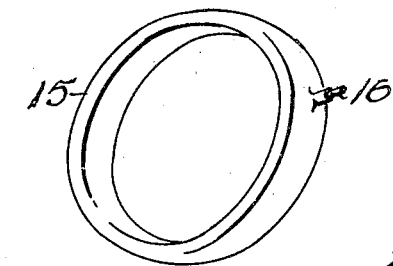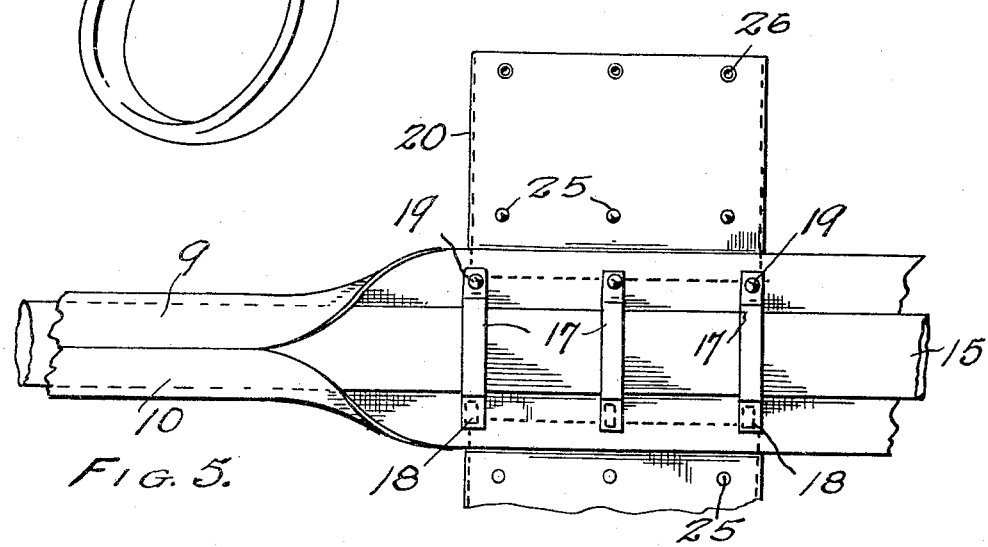

June 20, 1933.  L. A. F. RODGERS  1,914,866
COMBINATION KIT
Filed Aug. 6, 1931  3 Sheets-Sheet 3
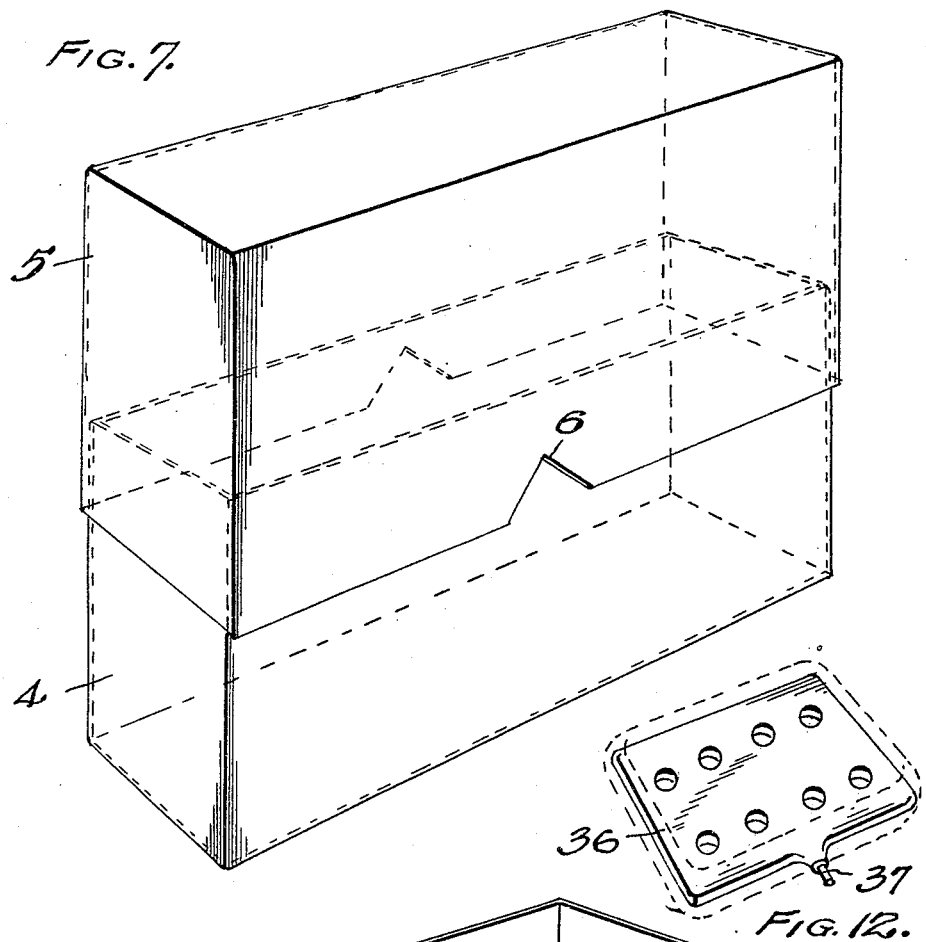
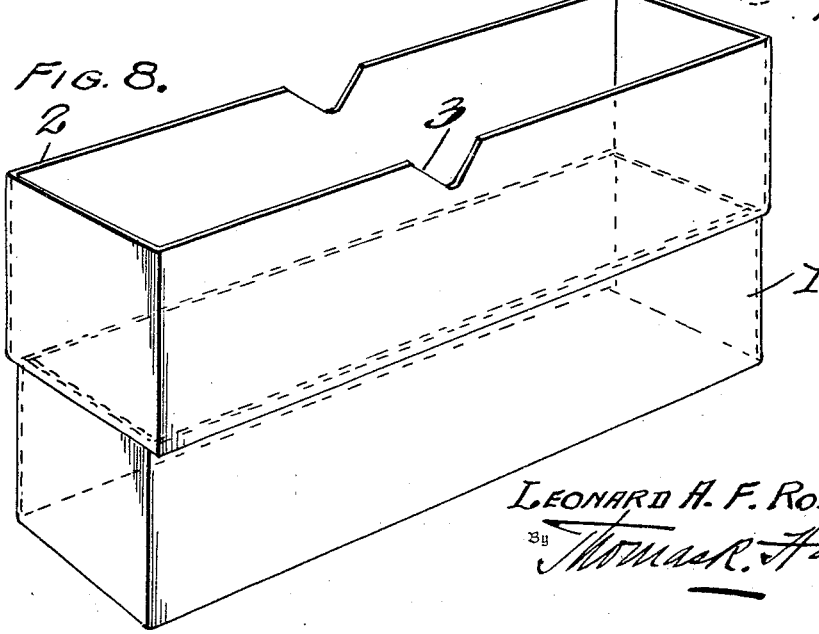
Inventor
LEONARD A. F. RODGERS.
By Thomas R. Harvey
Attorney Patented June 20, 1933

1,914,866

UNITED STATES PATENT OFFICE

LEONARD A. F. RODGERS, OF DETROIT, MICHIGAN

COMBINATION KIT

Application filed August 6, 1931. Serial No. 555,581.

My present invention relates to an improved combination kit or handy outfit, in which are combined and arranged in compact form or shape, various parts, that co-operate one with another to render the kit adaptable for numerous purposes and uses.

The combination kit or outfit is especially designed for use as an automobile accessory, which may be employed as a convenient and comfortable, cushioned arm-rest that is adapted to fit snugly against the interior upholstery of an automobile at the side of a seat. One passenger may use a kit as an arm-rest at one side of the car seat, and a second kit may be used by another passenger at the opposite side of the car, and in this manner one passenger may support his left arm, while the other passenger supports his right arm, by means of the kits. The kit is a size and shape to fit snugly against the side upholstery of the seat and yet not protrude far enough toward the front of the seat as to be in the way of the passenger. While I have referred to the combination kit as an arm-rest for automobiles, it will of course be understood that the kit is adapted as a portable arm-rest for boats, street cars, and other passenger carrying vehicles or craft.

Within the portable combination kit may be packed culinary utensils, lunches, first aid appliances, etc., or the telescopic container within the kit may be employed for carrying a baby's clothing, and for similar purposes.

The exterior of the kit is cushioned or padded, not only for convenience and comfort when the kit is used as an arm-rest, but the kit may be employed as a portable seat, as when camping, and the cushioning features of the kit protect the interior parts.

The invention consists in certain novel combinations and arrangements of parts as will hereinafter be more specifically pointed out and set forth in the claims. In the accompanying drawings, I have illustrated one complete example of the physical embodiment of my invention, and a modification thereof, wherein the parts are combined and arranged according to the best modes I have thus far devised for the practical application of the principles of my invention.

Figure 1 is a perspective view of the combination kit, showing the parts assembled, and the kit "packed" in compact form and adapted for use as a cushioned arm-rest or as a seat.

Figure 2 is a transverse sectional view, as at line 2—2 of Figure 1.

Figure 3 is a perspective view of the telescopic inner box, removed from the kit.

Figure 4 is a plan view showing the exterior side of the kit-cover, with the parts spread flat for convenience of illustration.

Figure 5 is a plan view showing a portion of the inner side of the cover, and illustrating the tubular or pneumatic cushion with its retaining loops, together with the foldable tube-casing, partly unfolded.

Figure 6 is a perspective view of the pneumatic tube used as a cushion.

Figure 7 is a perspective view of the telescopic case, removed from the kit, with the case-cover partly extended or opened, for convenience of illustration.

Figure 8 is a perspective view showing the parts of the inner box utilized as trays or containers.

Figure 9 is a plan view, on a reduced scale, showing the modified cover spread flat, and adapted for use with removable pads in lieu of the pneumatic cushion or tube.

Figure 10 is a detail view showing the cover of Figure 9 in longitudinal section, together with the pads of the arm-rest, and showing the telescopic case within the cover.

Figure 11 is a perspective view of one of the elastic cushion-pads used in Figure 10.

Figure 12 is a perspective view of an inflatable seat or pillow which may be used as one of the accessories of the kit or outfit.

In carrying out my invention, I utilize an inner box 1, having a lid 2 and notches 3 in the lower edge of the lid, to facilitate opening and closing of the box. This inner box is preferably of oblong shape and fashioned of suitable material, and it may be employed as a container for sandwiches and other foods, as illustrated in Figure 3, or the lid 2 may be inverted and placed on top of the box 1, thus permitting use of both the box and its lid as trays for provisions, etc.

The inner, telescopic box is encased within a telescopic case, also of oblong shape and fashioned of suitable material, and this case comprises the body portion 4 and lid 5, the latter having notches 6 for convenience in grasping the case when the lid 5 is to be removed or replaced. In Figure 2 the inner box is shown packed in the lower portion of the case, and a thermos bottle is indicated by dotted lines at 7, above the inner box. Another mode of packing the kit is illustrated in Figure 8 where the box 1 and its lid 2 are used as trays for containing various commodities, and these of course are encased within the case 4—5, and the thermos bottle 7 would de displaced under these conditions.

Both the inner box and the outer case are of the telescopic type, and they permit of expansion, as indicated in Figure 7 where the case is expanded, and as indicated in Figure 8 where the inner box is utilized to its full capacity. The inner box and the outer case are preferably fashioned of metal, as aluminum, in order that they may be strong and at the same time light in weight, and readily maintained in sanitary condition.

The outer case is provided with a cover of flexible material, as rubber, canvas, leather, or composition material, of suitable weight and color, which cover is foldable for packing or storing when not in use, which may readily be applied to the case, and which may with equal facility be removed from the case when access to the interior of the case is desired.

As shown in Figure 4 the cover is of cruciform, and includes a longitudinally extending, elongated, rectangular strip or sheet indicated as a whole by the numeral 8, and the side edges 9 and 10 of this strip are adapted to be folded at 11 and 12 respectively to form a casing. At the opposite ends of the strip are provided a buckle 13 and a complementary strap 14, and the strip is of suitable length to extend around the length of the top, bottom, and two ends of the case 4—5, with the free ends of the strip coupled together by the buckle and strap at the central portion of the bottom of the case.

When the edges of the strip are folded under along the lines 11 and 12 of Figure 4, they form a casing of the strip, that reaches around the length of the case, and within this casing a pneumatic tube or air cushion 15 is retained. The air cushion or pneumatic tube is equipped with the usual inflating valve 16, and as shown in Figure 6 the tube is approximately rectangular in cross section and of substantially the same width as the case 4—5. The endless tube or ring is of the proper size to extend around the kit, within the casing, and when properly inflated and removed from the kit, this tube may be utilized as a buoyant swimming accessory in well known manner. Under some conditions, instead of using an endless tube or ring, the pneumatic tube may be a straight tube of approximately the length of the strip 8, and, of course, in either event, the rubber tube is elastic and forms a resilient cushion. The top of the kit is thus provided with a covered, cushioned armrest, and the ends and bottom of the kit are provided with a cushioned pad to protect the kit.

For retaining the tube in proper position while assembling the parts, and after assembly, the underside of the strip 8 of the cover is provided with a number of loops as 17, stitched or anchored at one end to the strip, as at 18, and at the other end provided with detachable snap fasteners 19 for securing that end to the strip. While the fasteners 19 are detached, the tube may be slipped under the three loops, and after the fasteners 19 are snapped in place the tube is retained against the underside of the strip to facilitate folding over the two edges 9 and 10 as indicated in Figure 5, and by means of these loops the tube is retained in proper relation to the strip.

Two side wings 20 and 21 are stitched at 22 to the exterior of the strip, and these wings are fashioned with pockets 23 and 24 which are provided at their free edges with snap fasteners 25.

These side wings, and their pockets, are approximately the same size and shape as the sides of the kit, but the outer free edges of the wings project sufficiently in order that they may overlap at the bottom of the kit, and these overlapping edges are fastened together by the use of snap fasteners, the complementary members of the fasteners being indicated as 26 and 27.

At the ends of the kit are also provided smaller pockets as 28 and 29, each provided with a lapel or flap 30 and a snap fastener 31, and these pockets, as are also the pockets 23 and 24, are stitched or otherwise fastened to the outer faces of the strip.

In Figures 9 and 10 a slightly modified form of cover is indicated at 32, and this cover, with its strap and buckle at its ends is adapted to wrap around the case 4—5 in manner similar to the strip 8. The pockets 23, 24 fold down the sides of the kit and the overlapping, free edges of the pockets are fastened by snap fasteners. The end pockets 28 and 29 are also mounted on the strip 32, and the ends of the strip are secured by the buckle and strap.

Cross loops 33, similar to the loops 17 are attached at the underside of the strip 32, and in lieu of the pneumatic, rubber tube 15, I may use resilient pads as 34 and 35 which may be of sponge rubber, as indicated in Figures 10 and 11, or of other suitable material, to form an arm-rest on the top of the kit, but under the cover.

Various articles for convenience, comfort, and use may be carried in the pockets, as for instance the flat, inflatable rubber bag 36 having the inflating valve at 37, may be carried in one of the pockets 23 or 24. This flat bag may be inflated as indicated by dotted lines in Figure 12, and used as a seat cushion, pillow, or other accessory.

The case 4—5 it will be understood may be fashioned as a foldable or collapsible case in order that it may be closely compacted for storage when not in use, and, of course, the flexible cover may be folded into compact form to occupy a minimum of space when not in use.

The larger pockets 23 and 24 are adapted to contain various accessories, other than the inflatable seat-cushion or pillow shown in Figure 12, and the smaller pockets 28 and 29 may be used for stowing away of cigarette or cigar packages, and other commodities, or utensils.

From the above descrpition taken in connection with my drawings, it will be apparent that the outfit of my invention may be used as a lunch kit, as a baby kit adapted to contain various articles necessary for the comfort and convenience of a child, as an emergency kit, and for various other purposes, while the kit as a whole, after being packed for any of the these purposes, is especially adapted for use as a cushioned arm-rest for use in automobiles, as explained.

Having thus fully described my invention, what I claim as new and desire to secure by Letters Patent is:

1. In a portable kit, the combination with a telescopic case, of a flexible cover comprising an elongated strip of required length to fold around the top, the two ends, and the bottom of the case, a cushion mounted between the cover and the exterior of the case and retaining means on the strip for the cushion, a pair of outwardly extended side wings adapted to fold down the sides and under the case, and means for fastening the outer free ends of said wings.

2. In a portable kit, the combination with a telescopic case, of a flexible cover comprising an elongated strip of required length to fold around the top, the two ends and the bottom of the case, a separable cushion carried by the strip and means on the strip for retaining said cushion, a pair of pockets spaced from the longitudinal center of the strip and located at opposite ends of the case, co-acting fastening means at the opposite ends of the strip, side wings on the strip and pockets on said wings, and coacting fastening means on the longitudinal free edges of said wings beneath the case.

3. A flexible cover for a portable kit comprising an elongated strip having opposite lateral edges adapted to be folded inwardly and thereby form a tubular casing, a cushion within the casing, retaining means on the strip for securing the cushion within its casing, oppositely projecting side wings extended from the approximate center of the strip, and means for fastening together the outer longitudinal edges of the wings.

4. A flexible cover for a portable kit comprising an elongated strip having infolded lateral edges forming a tubular casing, a pneumatic tube enclosed within said casing, cross straps on the inner side of the strip for retaining said tube, means for fastening together the opposite ends of the strip, oppositely projecting side wings extended from the approximate center of the strip, and means for fastening together the outer longitudinal edges of the side wings.

In testimony whereof I have affixed my signature.

LEONARD A. F. RODGERS.